United States Patent
Newberg (10) Patent No.: US 11,561,232 B2
(45) Date of Patent: Jan. 24, 2023

(54) OPPOSING EDGES SYSTEM FOR SCANNING AND PROCESSING GLASS SLIDES

(71) Applicant: Leica Biosystems Imaging, Inc., Vista, CA (US)

(72) Inventor: Nicholas Newberg, San Marcos, CA (US)

(73) Assignee: Leica Biosystems Imaging, Inc., Vista, CA (US)

(*) Notice: Subject to any disclaimer, the term of this patent is extended or adjusted under 35 U.S.C. 154(b) by 733 days.

(21) Appl. No.: 16/152,212

(22) Filed: Oct. 4, 2018

(65) Prior Publication Data
US 2019/0101555 A1    Apr. 4, 2019

Related U.S. Application Data

(60) Provisional application No. 62/568,203, filed on Oct. 4, 2017.

(51) Int. Cl.
*G01N 35/00* (2006.01)
*B01L 3/00* (2006.01)
(Continued)

(52) U.S. Cl.
CPC ...... *G01N 35/00029* (2013.01); *B01L 3/5085* (2013.01); *B01L 9/523* (2013.01);
(Continued)

(58) Field of Classification Search
CPC .. G01N 35/00029; G01N 35/00; G01N 35/02; G01N 2035/00138;
(Continued)

(56) References Cited

U.S. PATENT DOCUMENTS 3,738,730 A * 6/1973 Binnings ............... G02B 21/34
                                                         359/391
4,248,498 A * 2/1981 Georges ................ G02B 21/26
                                                         356/244
(Continued)

FOREIGN PATENT DOCUMENTS

CN    1040442    3/1990
CN    1042995    6/1990
(Continued)

OTHER PUBLICATIONS

International Search Report and Written Opinion dated Dec. 6, 2018 for related International Application No. PCT/US2018/054460, in 16 pages.
(Continued)

*Primary Examiner* — Benjamin R Whatley
*Assistant Examiner* — Curtis A Thompson
(74) *Attorney, Agent, or Firm* — Frost Brown Todd LLC (57) ABSTRACT

A scanning stage with opposing edges to secure a slide during scanning and guide the slide during unloading. In an embodiment, the system includes a reference edge with a surface facing a first edge of the slide and an opposing edge with a surface facing a second edge of the slide. The opposing edge is controlled by a processor to engage the second edge of the slide and press the first edge of the slide against the reference edge surface. The opposing edge surface is parallel to a side of a slide rack slot into which the slide will be inserted during unloading. The system also includes an assembly having a pull bar configured to pull the glass slide from the scanning stage into the slide rack slot while the first edge of the slide is simultaneously being pressed against the reference edge surface by the opposing edge surface.

19 Claims, 6 Drawing Sheets

(51) Int. Cl.
  *B01L 9/00* (2006.01)
  *G02B 21/26* (2006.01)
  *G02B 21/34* (2006.01)
  *G01N 35/02* (2006.01)
  *B65B 21/02* (2006.01)
  *A47B 81/06* (2006.01)
  *G02B 21/24* (2006.01)

(52) U.S. Cl.
  CPC ............ *G02B 21/26* (2013.01); *G02B 21/34* (2013.01); *A47B 81/06* (2013.01); *B01L 2300/0627* (2013.01); *B65B 21/02* (2013.01); *G01N 35/00* (2013.01); *G01N 35/02* (2013.01); *G01N 2035/00039* (2013.01); *G01N 2035/00049* (2013.01); *G01N 2035/00138* (2013.01); *G02B 21/24* (2013.01)

(58) Field of Classification Search
  CPC .......... G01N 2035/00039; G01N 2035/00049; G02B 21/34; G02B 21/26; G02B 21/24; B01L 3/5085; B01L 9/523; B01L 2300/0627; B65B 21/02; A47B 81/06
  See application file for complete search history.

(56) References Cited

U.S. PATENT DOCUMENTS

| | | | |
|---|---|---|---|
| 4,367,915 A | 1/1983 | Georges | |
| 5,367,401 A * | 11/1994 | Saulietis | G02B 21/26 359/398 |
| 5,386,318 A * | 1/1995 | Kuhnert | G01N 35/04 414/744.8 |
| 6,395,554 B1 * | 5/2002 | Regan | G01N 35/028 422/65 |
| 6,847,481 B1 * | 1/2005 | Ludl | G01N 35/04 359/368 |
| 7,753,457 B2 | 7/2010 | Wood | |
| 8,902,501 B2 | 12/2014 | Suzuki et al. | |
| 10,942,347 B2 * | 3/2021 | Newberg | G02B 21/34 |
| 2002/0101654 A1 * | 8/2002 | Pfeifer | G01N 1/2813 359/368 |
| 2010/0139338 A1 * | 6/2010 | Wintersteiger | E05B 47/0607 70/78 |
| 2012/0002276 A1 * | 1/2012 | Suzuki | G02B 21/26 359/391 |
| 2015/0092265 A1 | 4/2015 | Yamashita | |

FOREIGN PATENT DOCUMENTS

| | | |
|---|---|---|
| CN | 1217476 | 5/1999 |
| CN | 1373900 | 10/2002 |
| CN | 101715564 | 5/2010 |
| CN | 101802328 | 8/2010 |
| CN | 102313978 | 1/2012 |
| CN | 102607921 | 7/2012 |
| CN | 103033408 | 4/2013 |
| CN | 203350526 | 12/2013 |
| CN | 104505353 | 4/2015 |
| CN | 106019607 | 10/2016 |
| CN | 205844612 | 12/2016 |
| CN | 106415356 | 2/2017 |
| CN | 106885709 | 6/2017 |
| CN | 206224042 | 6/2017 |
| DE | 4019859 | 1/1992 |
| EP | 2993510 | 3/2016 |
| JP | 2017-021275 A | 1/2017 |
| WO | WO2009109298 | 9/2009 |
| WO | WO2013170366 | 11/2013 |
| WO | WO2019/071040 A1 | 4/2019 |

OTHER PUBLICATIONS

International Preliminary Reporton Patentability dated Mar. 12, 2020; in International Application No. PCT/US2018/54460 filed Oct. 4, 2018; in 11 pages.
Written Opinion dated Dec. 6, 2018; in International Application No. PCT/US2018/54460 filed Oct. 4, 2018; in 7 pages.
Decision to Grant dated Nov. 29, 2021; in Japanese Application No. 2020-518679, filed Mar. 31, 2020; in 5 pages.
Search Report dated Nov. 1, 2021; in Japanese Application No. 2020-518679, filed Mar. 31, 2020; in 37 pages.
Extended European Search Report dated Jan. 29, 2021; in European Application No. 18864073.4, filed Dec. 18, 2019; in 9 pages.
International Preliminary Report on Patentability dated Mar. 12, 2020; in European Application No. 18864073.4, filed Dec. 18, 2019; in 7 pages.
Search Report dated Jul. 6, 2021; in Chinese Application No. 201880064836, filed Apr. 20, 2020; in 2 Pages.
Decision to Grant dated Jan. 25, 2022; in Chinese Application No. 201880064836, filed Apr. 3, 2020; in 5 pages.
Office Action dated Jul. 15, 2021; in Chinese Application No. 201880064836, filed Apr. 3, 2020; in 18 pages.

* cited by examiner

OPPOSING EDGES SYSTEM FOR SCANNING AND PROCESSING GLASS SLIDES

CROSS-REFERENCE TO RELATED APPLICATIONS

The present application claims priority to U.S. Provisional Patent Application No. 62/568,203, filed on Oct. 4, 2017, which is hereby incorporated herein by reference as if set forth in full.

BACKGROUND

Field of the Invention

The present invention generally relates to a digital slide scanning apparatus, and more particularly, to a scanning stage with a fixed reference edge and a movable opposing edge that are used to secure a slide (e.g., glass slide) to a support surface of the scanning stage of the digital slide scanning apparatus (e.g., for digital pathology).

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Glass slides that are scanned by a digital slide scanning apparatus must remain stationary, relative to the stage, during scanning to generate high quality digital image data. Additionally, when a glass slide is unloaded from the scanning stage into a slide rack, the orientation of the edges of a glass slide must be tightly controlled, to avoid damaging the glass slide. Conventional digital slide scanners employ costly solutions to ensure high quality digital image data and avoid damaging glass slides during processing. Therefore, what is needed is a system and method that overcomes these significant problems found in the conventional systems described above.

SUMMARY

Accordingly, an opposing edges system is described herein that both secures a glass slide during scanning and guides a glass slide being unloaded from the scanning stage into a slide rack. In an embodiment, the system includes a fixed reference edge that has a surface facing a first edge (e.g., first long edge) of the glass slide. The system also includes a movable opposing edge that has a surface facing a second edge (e.g., second long edge) of the glass slide. The movable opposing edge is controlled by a processor of the digital scanning apparatus. When a glass slide is loaded onto the stage, the movable opposing edge is controlled by the processor to engage the opposing edge surface with the second edge of the glass slide. The processor further controls the movable opposing edge to press the first edge of the glass slide against the reference edge surface, and thereby secure the glass slide for scanning.

The processor also controls the movable opposing edge to press the first edge of the glass slide against the reference edge surface when the glass slide is being unloaded from the scanning stage into the slide rack. Advantageously, the reference edge surface is parallel to a side of the slide rack slot into which the glass slide will be inserted. The system also includes a push/pull assembly that includes a pull bar that is configured to pull the glass slide from the scanning stage into the slot of the slide rack while the first long edge of the glass slide is simultaneously being pressed against the reference edge surface.

In an embodiment, a digital slide scanning device is disclosed that comprises: a stage comprising a surface upon which a glass slide is positioned during scanning, the glass slide having a first long edge and a second long edge and a first short edge and a second short edge; a reference edge attached to the stage and positioned adjacent to the first long edge of the glass slide, at least a portion of the reference edge extending above the surface upon which the glass slide is positioned during scanning; an opposing edge attached to the stage and positioned proximal to the second long edge of the glass slide, at least a portion of the opposing edge extending above the surface upon which the glass slide is positioned during scanning, wherein the opposing edge is configured to move toward the reference edge and away from the reference edge; a processor configured to control the opposing edge, wherein prior to scanning of the glass slide, the processor controls the opposing edge to move toward the reference edge and engage the second long edge of the glass slide and press the first long edge of the glass slide against the reference edge. A surface of the reference edge facing the glass slide may be angled such that a lower portion of the reference edge surface facing the glass slide is recessed away from the glass slide. A surface of the opposing edge facing the glass slide may be angled such that a lower portion of the opposing edge surface facing the glass slide is recessed away from the glass slide. A surface of the reference edge facing the glass slide may be angled such that a lower portion of the reference edge surface facing the glass slide is recessed away from the glass slide and wherein a surface of the opposing edge facing the glass slide is angled such that a lower portion of the opposing edge surface facing the glass slide is recessed away from the glass slide and wherein when the angled opposing edge surface presses the glass slide against the angled reference edge surface, the combined angled surface provide downward pressure and secure the slide to the surface of the stage. The opposing edge may comprise a spring arm that pivots above the surface of the stage upon which the glass slide is positioned, the spring arm operatively connected to a linear spring configured to actuate the spring arm and press a surface of the opposing edge against the second long edge of the glass slide. The processor may be configured to control operation of the linear spring and thereby control movement of the opposing edge. The processor may control the opposing edge to move the opposing edge away from the reference edge during loading of a glass slide from the slide rack onto the scanning stage. The processor may control the opposing edge to maintain contact between a surface of the opposing edge and the glass slide and a surface of the reference edge and the glass slide during scanning of the glass slide.

In an embodiment, a method is disclosed comprising: positioning a glass slide on a surface of a scanning stage, the glass slide comprising a first long edge, a second long edge, a first short edge and a second short edge, wherein the first long edge of the glass slide is adjacent a reference edge; controlling an opposing edge to engage the second long edge of the glass slide; controlling the opposing edge to press the first long edge of the glass slide against the reference edge; and maintaining contact between the opposing edge and the second long edge of the glass slide and the first long edge of the glass slide and the reference edge during scanning of the glass slide. The method may further comprise controlling the opposing edge to press the first long edge against the reference edge while controlling a push/pull assembly to unload the glass slide from the stage into a slide rack.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

An opposing-edges system is disclosed herein for the scanning and processing of glass slides by a digital slide scanning apparatus. In an embodiment, the system comprises a fixed reference edge and a movable opposing edge (e.g., a spring arm) that are positioned on opposite sides of a support surface of a scanning stage upon which a glass slide is positioned for scanning. The movable opposing edge is controlled to move toward the fixed reference edge and engage the glass slide to secure the glass slide to the scanning stage during scanning. The glass slide remains secured between the movable opposing edge and the fixed edge when the glass slide is unloaded from the stage to a slide rack of the digital slide scanning apparatus, and a push/pull assembly pulls the slide from the scanning stage into the slide rack. In an embodiment, the fixed reference edge is parallel to and/or aligned with a side of the slide rack in which the glass slide is being inserted.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
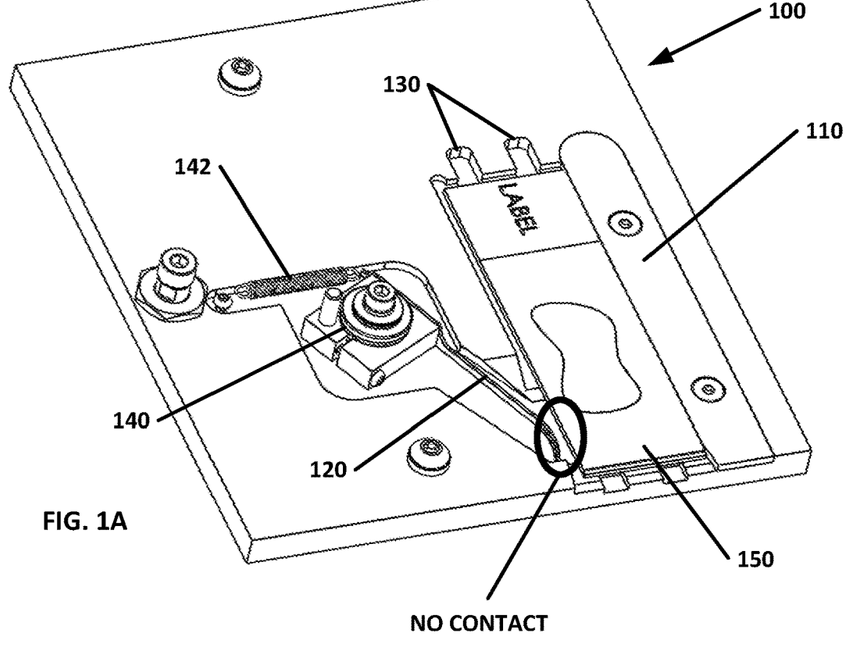
FIG. 1A is a perspective view diagram illustrating an example scanning stage with a glass slide positioned between a reference edge and an opposing edge during loading, according to an embodiment.

FIG. 1A is a perspective view diagram illustrating an example scanning stage with a glass slide positioned between a reference edge and an opposing edge during loading onto the stage 100, according to an embodiment. In the illustrated embodiment, the scanning stage 100 has a reference edge 110 positioned with a surface that is facing a first long edge of the adjacent glass slide 150 positioned on the stage 100 for scanning. The scanning stage 100 also includes a movable opposing edge 120 having a surface facing a second long edge of the glass slide 150 positioned on the stage 100 for scanning. The movable opposing edge 120 is configured to move toward the reference edge 110 or away from the reference edge 110, for example, under the control of a processor of the digital slide scanning apparatus. The scanning stage 100 also includes one or more pull finger grooves 130 to facilitate unloading of the glass slide 150 from the scanning stage 100 and into a slide rack 250 (e.g., illustrated in FIGS. 2A and 2B, according to an embodiment).

Embodiments will be primarily described herein as sandwiching a glass slide between the reference edge 110 and the movable opposing edge 120 along the glass slide's long edge. However, in an alternative embodiment, the glass slide could be sandwiched between the reference edge 110 and the movable opposing edge 120 along the glass side's short edge. Furthermore, there is no requirement that the slides be glass slides. Slides, other than glass slides, can be loaded, unloaded, and supported on the stage 100 in the same manner as described herein with respect to glass slides.

In the illustrated embodiment, in FIG. 1A, the surface of the movable opposing edge 120 is not in contact with the glass slide 150. In an embodiment, the processor of the digital slide scanning apparatus controls the movable opposing edge 120 to not make contact with the glass slide 150 during loading of the glass slide 150 from the slide rack 250 onto the scanning stage 100.

In the illustrated embodiment, the movable opposing edge 120 comprises a spring arm that is moved by a rotary bearing 140 in conjunction with a linear spring 142. However, it should be understood that other commercial off-the-shelf components may be used to move the movable opposing edge 120. In addition, any means, other than a spring arm, may be used to implement the movable opposing edge 120, as long as the movable opposing edge 120 can be moved between a position in which at least a portion of the movable opposing edge 120 contacts and applies pressure to the glass slide 150 and a position in which the movable opposing edge 120 does not contact or apply pressure to the glass slide 150. In an embodiment, the movable opposing edge 120 and the mechanism that moves the movable opposing edge 120 are implemented so as to enable a processor to control the movable opposing edge 120 to apply at least two different amounts of pressure when in contact with the glass slide 150 (e.g., a first amount of pressure for scanning, and a second amount of pressure for unloading).

Figure 1B:
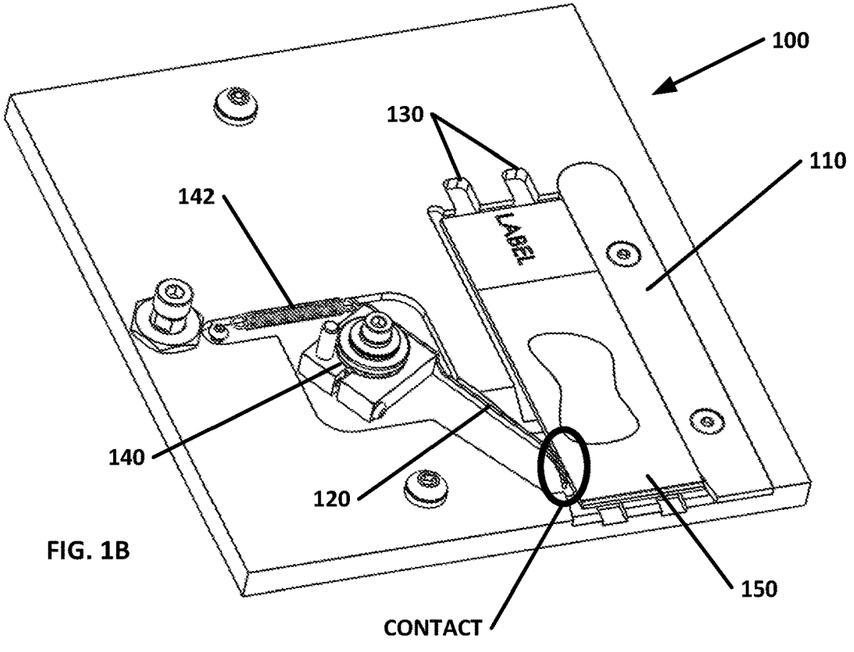
FIG. 1B is a perspective view diagram illustrating an example scanning stage with a glass slide positioned between a reference edge and an opposing edge during scanning, according to an embodiment.

FIG. 1B is a perspective view diagram illustrating the scanning stage 100 with the glass slide 150 positioned between the reference edge 110 and the opposing edge 120 during scanning, according to an embodiment. In contrast to FIG. 1A, in FIG. 1B, the surface of the movable opposing edge 120 is in contact with the glass slide 150. As mentioned above, the processor of the digital slide scanning apparatus may be configured to control the movable opposing edge 120 to move at least an end surface of the movable opposing edge 120 toward the reference edge 110, from a position that does not contact the glass slide 150 (e.g., illustrated in FIG. 1A) to a position that does contact the glass slide 150 (e.g., illustrated in FIG. 1B). The movable opposing edge 120 is configured to engage the second long edge of the glass slide 150 with an end surface of the movable opposing edge 120 that faces the glass slide 150. Specifically, the end surface of the movable opposing edge 120 imparts lateral pressure to the glass slide 150 to press the first long edge of the glass slide 150 against the surface of the reference edge 110 that is facing the glass slide 150. This secures the glass slide 150 to the surface of the stage 100, between the reference edge 110 and the pressing end surface of the movable opposing edge 120, during scanning.

Figure 1C:
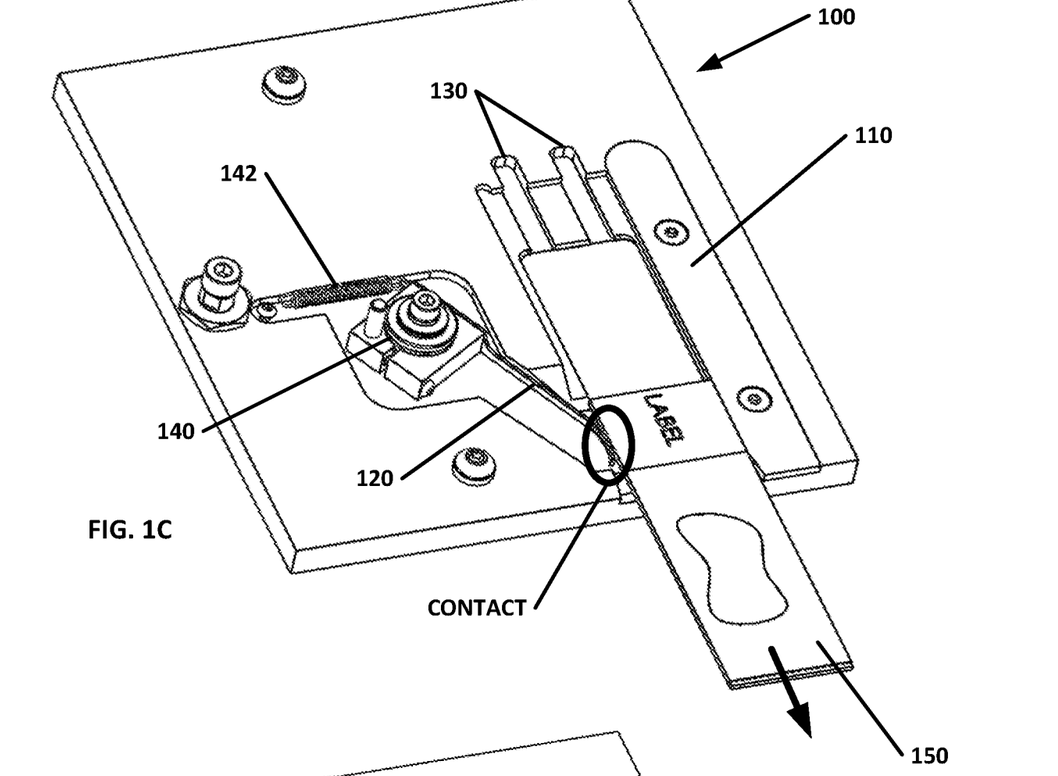
FIG. 1C is a perspective view diagram illustrating an example scanning stage with a glass slide positioned between a reference edge and an opposing edge during unloading, according to an embodiment.

FIG. 1C is a perspective view diagram illustrating the scanning stage 100 with the glass slide 150 positioned between the reference edge 110 and the opposing edge 120 during unloading from the stage 100, according to an embodiment. As illustrated, the end surface of the movable opposing edge 120 is in contact with the glass slide 150. The movable opposing edge 120 is configured to impart lateral pressure to press the first long edge of the glass slide 150 against the facing surface of the fixed reference edge 110 while the glass slide 150 is being unloaded from the slide stage 100. The facing surface of the fixed reference edge 110 may be positioned parallel to and aligned with a side of the slide rack 250 into which the glass slide 150 is being inserted.

In an embodiment, the amount of pressure applied to the glass slide 150 by the movable opposing edge 120 during unloading is less than the amount of pressure applied to the glass slide 150 by the movable opposing edge 120 during scanning. For example, the processor of the digital slide scanning apparatus may control the movable opposing edge 120 to apply less pressure from the end surface to the glass slide 150 during unloading, and control the movable opposing edge 120 to apply more pressure from the end surface to the glass slide 150 during scanning.

Figure 1D:
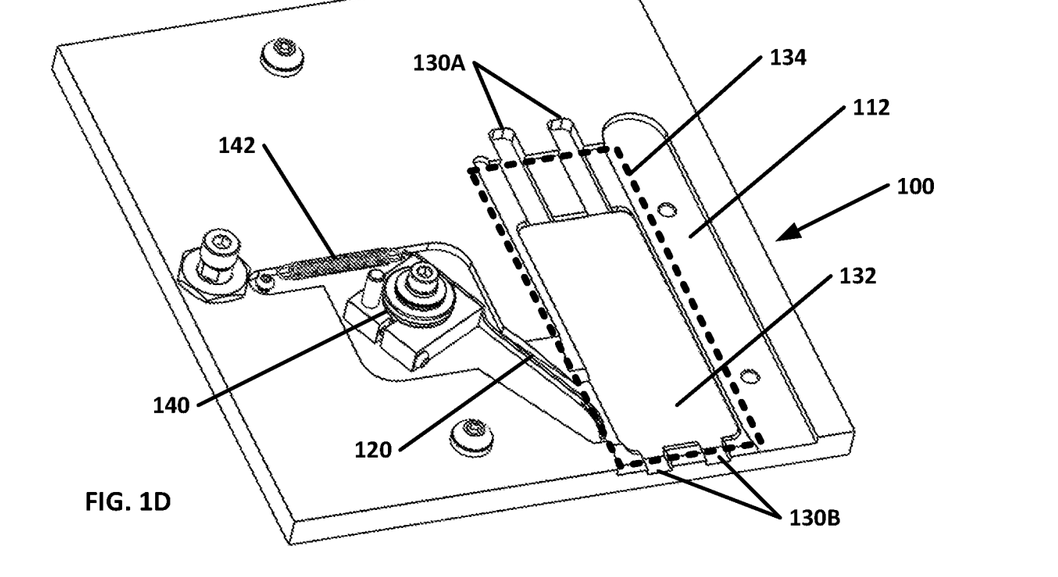
FIG. 1D is a perspective view diagram illustrating an example scanning stage with no glass slide and the reference edge removed to illustrate the underlying structure, according to an embodiment.

FIG. 1D is a perspective view diagram illustrating the scanning stage 100 with no glass slide 150 and the reference edge 110 removed to illustrate the underlying structure, according to an embodiment. As illustrated, the stage 100 comprises a through hole 132 in the surface upon which the glass slide 150 rests, such that the glass slide 150 can be illuminated from below (e.g., by illumination system 595). In the illustrated embodiment, the through hole 132 also separates the pull finger groove(s) 130 into two sections 130A and 130B on opposite sides of the through hole 132. Each pull finger groove in one section 130A/130B is aligned, in a line across the through hole, with a corresponding pull finger groove in the other section 130B/130A.

As illustrated, the through hole 132 is surrounded on two or more sides by a slide support surface 134 of the stage 100, upon which the glass slide 150 rests. In the illustrated embodiment, the pull finger grooves 130 are provided within the slide support surface 134 on both short sides of the through hole 132. The slide support surface 134 may be recessed into the scanning stage 100. In an embodiment, the depth of this slide recess may be sized such that, when a glass slide 150 rests on the slide support surface 134, the top surface of the glass slide 150 is substantially flush with the top surface of the scanning stage 100. Alternatively, the depth of the slide recess may be sized such that, when a glass slide 150 rests on the slide support surfaces 134, the top surface of the glass slide is slightly below the top surface of the scanning stage 100. As another alternative, the depth of the slide recess may be sized such that, when a glass slide 150 rests on the slide support surfaces 134, the top surface of the glass slide is slightly above the top surface of the scanning stage 100.

In an embodiment, the stage 100 comprises a reference edge groove 112 into which the reference edge is fitted and secured (e.g., via one or more screws). The reference edge groove 112 is formed such that the reference edge 110 is positioned on a support surface on one side of the through hole 132 (e.g., a long side), such that a first side of the reference edge 110 is parallel to and aligned with a side of the slot in the slide rack 250 into which the glass slide 150 is unloaded or inserted. The movable opposing edge 120 is attached to a top surface of the stage 100 on an opposite side of the through hole 132 than the reference edge 110. The movable opposing edge 120 is configured to impart lateral pressure to the glass slide 150 to press the glass slide 150 against the first side of the reference edge 110 in order to maintain a parallel orientation between the long edge of the glass slide 150, that is pressed against the first side of the reference edge 110, and the side of the slot in the slide rack 250 into which the glass slide is unloaded or inserted.

Figure 2A:
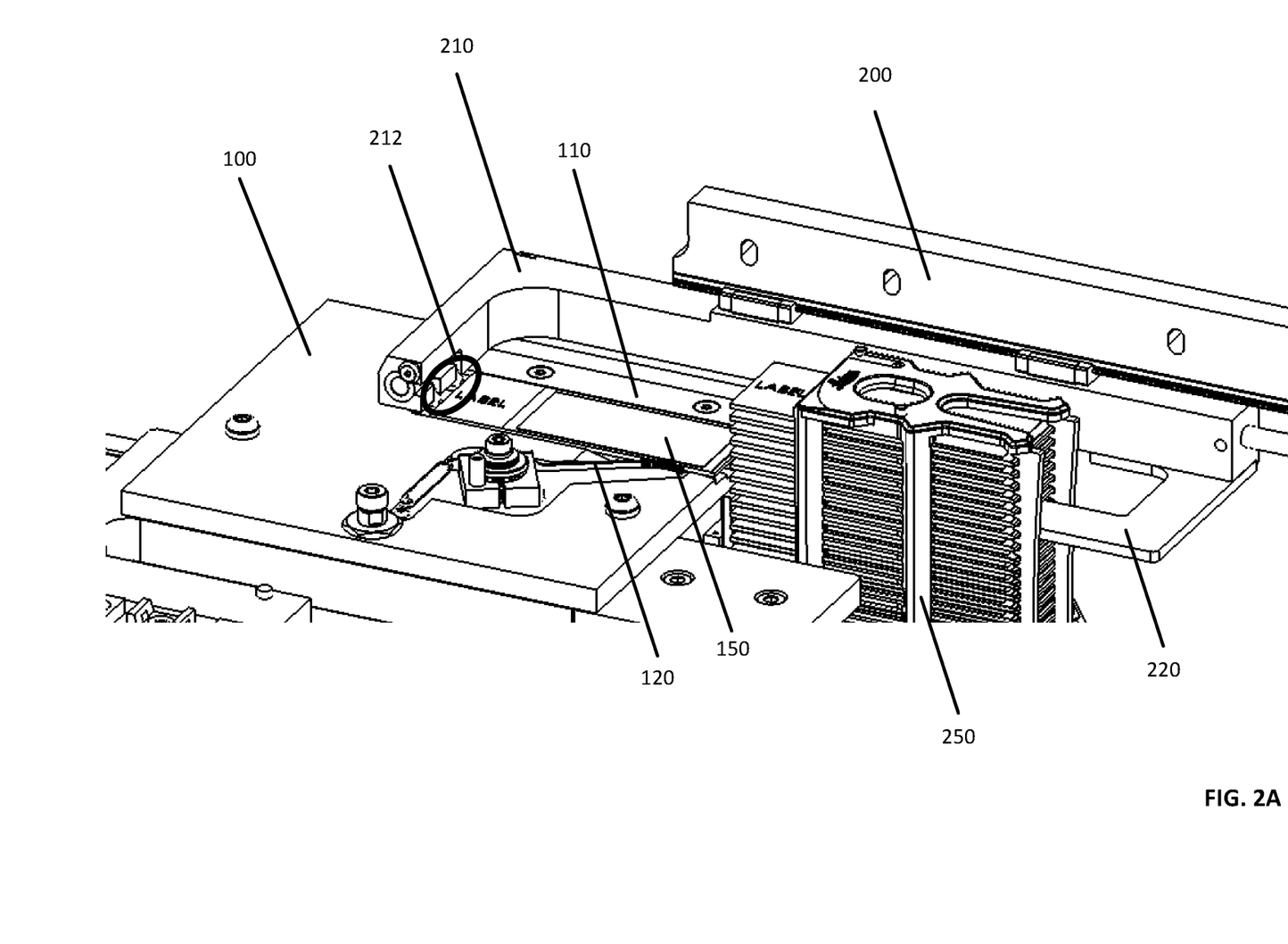
FIGS. 2A and 2B are perspective view diagrams illustrating an example scanning stage with a glass slide positioned between a reference edge and opposing spring arm and an example push/pull assembly unloading the glass slide from the scanning stage to a slide rack in a digital slide scanning apparatus, according to an embodiment.
Figure 2B:
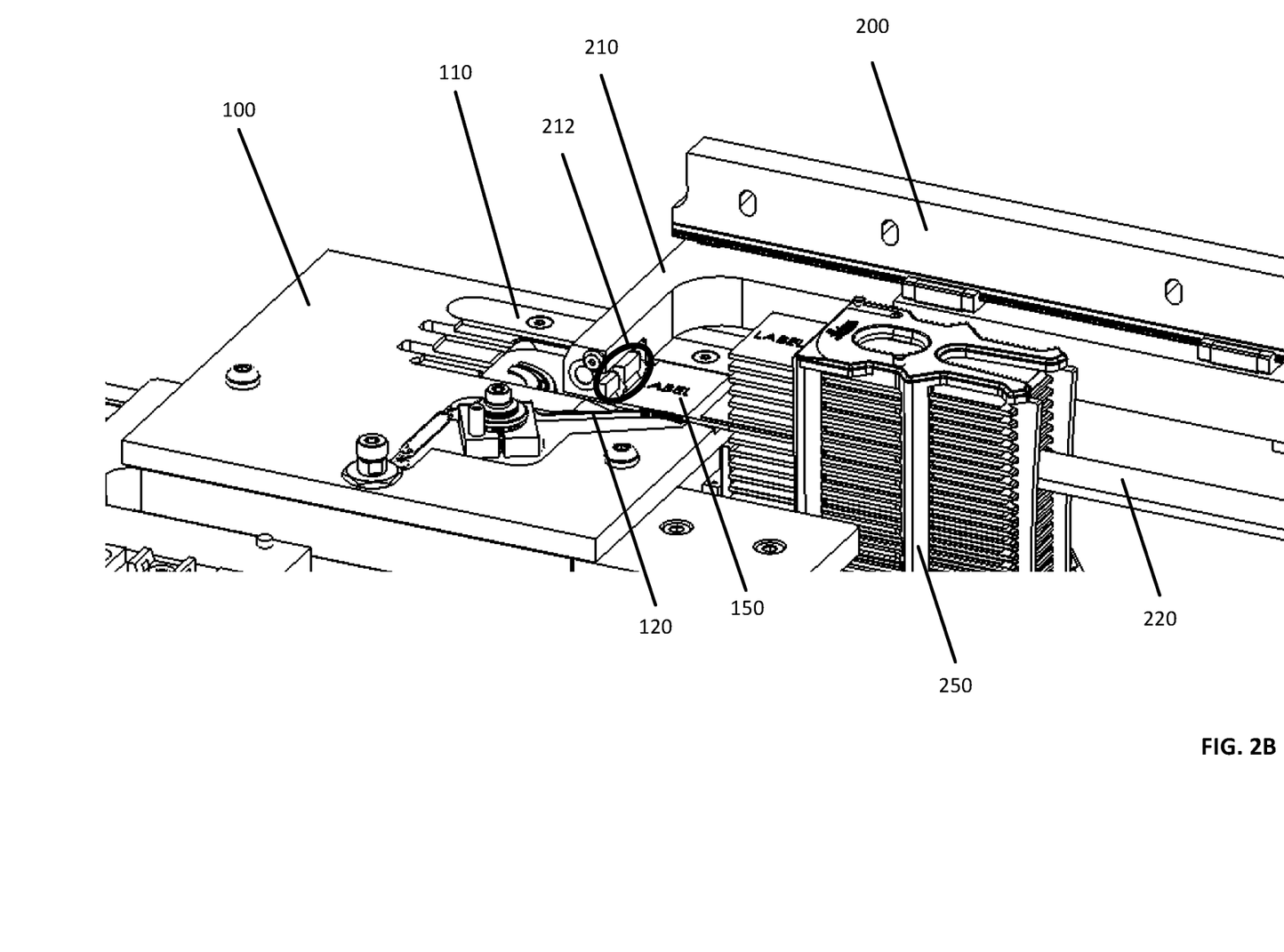

FIGS. 2A and 2B are perspective view diagrams illustrating an example push/pull assembly 200, slide rack 250, and scanning stage 100 of a digital slide scanning apparatus, according to an embodiment. In the illustrated embodiment, the push/pull assembly 200 is shown comprising a push bar 220 extending into the slide rack 250. The illustrated push/pull assembly 200 also comprises a pull bar 210 with an open end comprising one or more pull fingers 212. Pull finger(s) 212 are configured to move within corresponding pull finger groove(s) 130 in the stage 100.

In an embodiment, the processor of the digital slide scanning apparatus controls the push/pull assembly 200 to load a glass slide 150 from the slide rack 250 onto the scanning stage 100, and unload the glass slide 150 from the scanning stage 100 into the slide rack 250. Specifically, the push bar 220 and pull fingers 212 work in combination to push a glass slide 150, to be scanned, out from the slide rack 250 and onto the slide support surface 134 of the scanning stage 100. After the glass slide 150 is scanned, the push bar 220 and pull fingers 212 work in combination to push the glass slide 150 off the slide support surface 134 of the scanning stage 100 and into a slot in the slide rack 250 that is aligned with and in the same plane as the slide recess in the scanning stage 100. FIG. 2A illustrates the push/pull assembly 200 when a glass slide 150 is entirely supported on the scanning stage 100, whereas FIG. 2B illustrates the push/pull assembly 200 when the glass slide 150 is partially supported on the scanning stage 100 and partially within a slot of the slide rack 250 (e.g., during loading or unloading of the glass slide 150).

Figure 3:
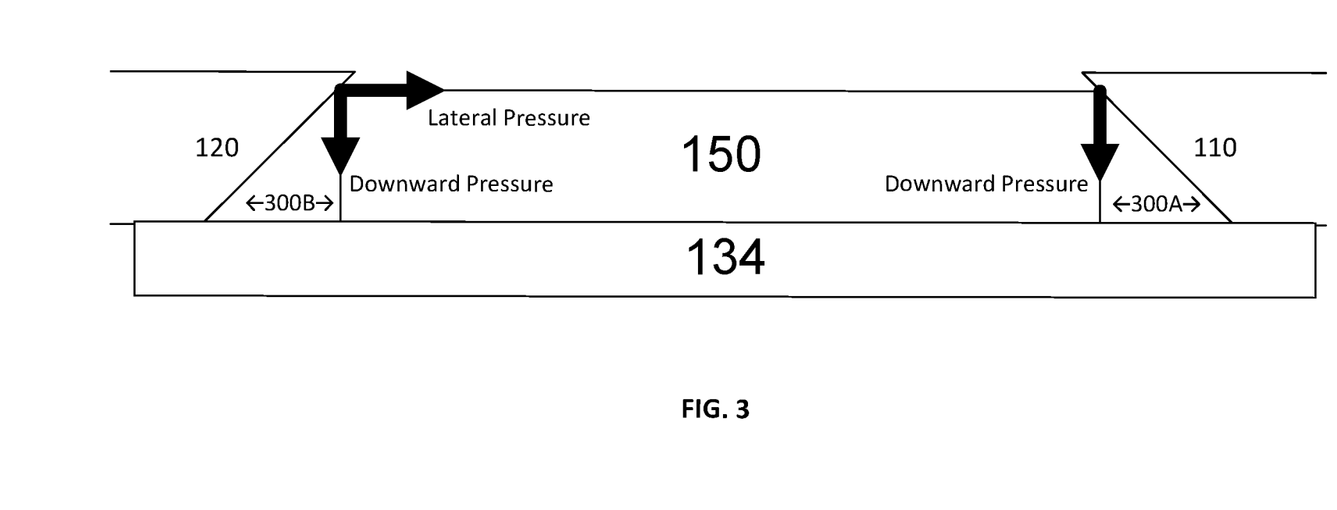
FIG. 3 is a block diagram illustrating an example glass slide positioned between a reference edge and opposing edge, according to an embodiment.

FIG. 3 is a block diagram illustrating an example glass slide 150, positioned between the reference edge 110 and the movable opposing edge 120, according to an embodiment. In the illustrated embodiment, the facing surfaces of both the fixed reference edge 110 and the movable opposing edge 120, that face the glass slide 150, are configured at an angle. Specifically, the top of both facing surfaces contact a top portion of the glass slide 150, and, from the top to bottom, gradually recede away from the side surfaces of the glass slide 150, such that the bottom of both facing surfaces do not contact or are recessed away from a bottom portion of the glass slide 150. In other words, at a top of the glass slide 150, the facing surfaces of the fixed reference edge 110 and the movable opposing edge 120 contact the glass slide 150, whereas, at the bottom of the glass slide 150, there is a gap 300A between the facing surface of the fixed reference edge 110 and the glass slide 150 and a gap 300B between the facing surface of the movable opposing edge 120 and the glass slide 150. This orientation of the angled facing surfaces imparts downward pressure on the glass slide 150 to secure the glass slide 150 to the slide support surface 134 of the scanning stage 100 when the opposing edge 120 laterally presses the glass slide 150 into the reference edge 110.

Example Embodiments

In an embodiment, a digital slide scanning apparatus includes a stage comprising a surface upon which a glass slide is positioned during scanning, the glass slide having a first long edge and a second long edge and a first short edge and a second short edge. The scanning apparatus also includes a reference edge attached to the stage and positioned adjacent to the first long edge of the glass slide when the slide is positioned for scanning. At least a portion of the reference edge extends above the surface upon which the glass slide is positioned during scanning. The scanning device also includes an opposing edge attached to the stage and positioned proximal to the second long edge of the glass slide. Similarly to the reference edge, at least a portion of the opposing edge extends above the surface upon which the glass slide is positioned during scanning. The opposing edge is also configured to move toward the reference edge and away from the reference edge. The scanning apparatus also includes a processor configured to control the movable opposing edge, such that, prior to scanning of the glass slide, the processor controls the opposing edge to move toward the reference edge and engage the second long edge of the glass slide to press the first long edge of the glass slide against the reference edge.

In an embodiment, a surface of the reference edge facing the glass slide is angled such that a lower portion of the reference edge surface facing the glass slide is recessed away from the glass slide. Similarly, in an embodiment, a surface of the opposing edge facing the glass slide is angled such that a lower portion of the opposing edge surface facing the glass slide is recessed away from the glass slide. When the angled opposing edge surface presses the glass slide against the angled reference edge surface, the combined angled surfaces provide downward pressure and secure the slide to a surface of the stage.

In an embodiment, the opposing edge comprises a spring arm that pivots above the surface of the stage upon which the glass slide is positioned, the spring arm operatively connected to a linear spring configured to actuate the spring arm and press a surface of the opposing edge against the second long edge of the glass slide. In an embodiment, the processor is configured to control operation of the linear spring and thereby control movement of the opposing edge. In an embodiment, the processor controls the opposing edge to move the opposing edge away from the reference edge during loading of a glass slide from the slide rack onto the scanning stage. In an embodiment, the processor controls the opposing edge to maintain contact between a surface of the opposing edge and the glass slide and a surface of the reference edge and the glass slide during scanning of the glass slide.

In an embodiment, a method comprises positioning a glass slide on a surface of a scanning stage, the glass slide comprising a first long edge, a second long edge, a first short edge, and a second short edge, wherein the first long edge of the glass slide is adjacent a reference edge. The method also comprises controlling an opposing edge to engage the second long edge of the glass slide, and controlling the opposing edge to press the first long edge of the glass slide against the reference edge. The method also comprises maintaining contact between the opposing edge and the second long edge of the glass slide and the first long edge of the glass slide and the reference edge during scanning of the glass slide. In an embodiment, the method also includes controlling the opposing edge to press the first long edge against the reference edge, while controlling a push/pull assembly to unload the glass slide from the stage into a slide rack.

Example Digital Slide Scanning Apparatus

Figure 4A:
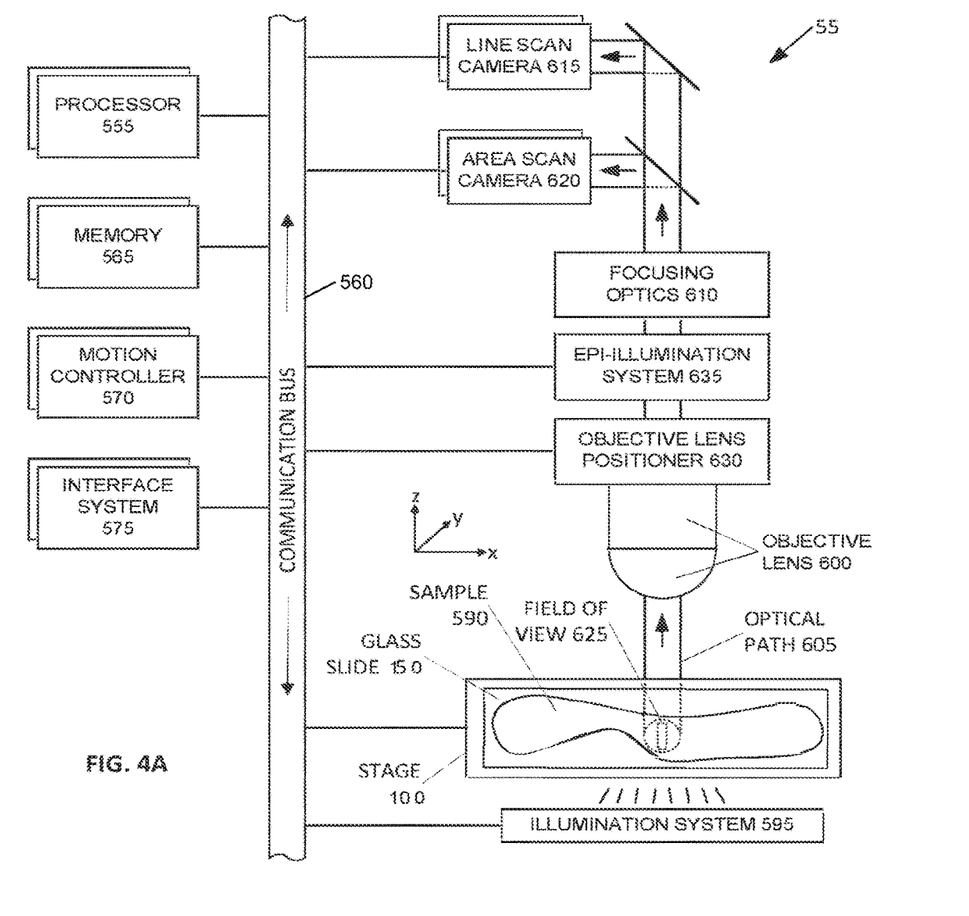
FIG. 4A is a block diagram illustrating an example processor-enabled device that may be used in connection with embodiments described herein.

FIG. 4A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a scanning apparatus, a digital scanning apparatus, a digital slide scanning apparatus, etc.) that comprises one or more processors 555, one or more memories 565, one or more motion controllers 570, one or more interface systems 575, one or more movable stages 100 that each support one or more glass slides 150 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more additional cameras 620 (e.g., a line scan camera or an area scan camera), each of which define a separate field of view 625 on the sample 590 and/or glass slide 150. The various elements of the scanner system 550 are communicatively coupled via one or more communication busses 560. Although there may be one or more of each of the various elements of the scanner system 550, for the sake of simplicity, these elements will be described herein in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling the line scan camera 615, the stage 100, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals, and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 100 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source may comprise a variable intensity halogen light source with a concave reflective mirror to maximize light output and a KG-1 filter to suppress heat. The light source could also comprise any type of arc-lamp, laser, or other source of light. In an embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. The illumination system 595 may be configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 100 is configured for precise X-Y movement under control of the processor 555 or the motion controller 570. The movable stage may also be configured for Z movement under control of the processor 555 or the motion controller 570. The movable stage is configured to position the sample in a desired location during image data capture by the line scan camera 615 and/or the area scan camera. The movable stage is also configured to accelerate the sample 590 in a scanning direction to a substantially constant velocity, and then maintain the substantially constant velocity during image data capture by the line scan camera 615. In an embodiment, the scanner system 550 may employ a high-precision and tightly coordinated X-Y grid to aid in the location of the sample 590 on the movable stage 100. In an embodiment, the movable stage 100 is a linear-motor-based X-Y stage with high-precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 150 upon which the sample 590 is disposed.

The sample 590 can be anything that may be interrogated by optical microscopy. For example, a glass microscope slide 150 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630, which, in an embodiment, employs a very precise linear motor to move the objective lens 600 along the optical axis defined by the objective lens 600. For example, the linear motor of the objective lens positioner 630 may include a 50 nanometer encoder. The relative positions of the stage 100 and the objective lens 600 in X, Y, and/or Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40X, 0.75NA or 20X, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens 600 becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600, combined with the focusing optics 610, provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 100 can be synchronized with the line rate of the line scan camera 615, so that the stage 580 stage 100 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the other line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information, to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 150. The glass slide 150 is securely placed on the movable stage 100 of the scanner system 550 for scanning the sample 590. Under control of the processor 555, the movable stage 100 accelerates the sample 590 to a substantially constant velocity for sensing by the line scan camera 615, where the speed of the stage is synchronized with the line rate of the line scan camera 615. After scanning a stripe of image data, the movable stage 100 decelerates and brings the sample 590 to a substantially complete stop. The movable stage 100 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion or the entire sample 590. The scanning of the sample 590 may include acquiring vertical image stripes or horizontal image stripes. The scanning of the sample 590 may be either top-to-bottom, bottom-to-top, or both (bi-directional), and may start at any point on the sample. Alternatively, the scanning of the sample 590 may be either left-to-right, right-to-left, or both (bi-directional), and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 4B:
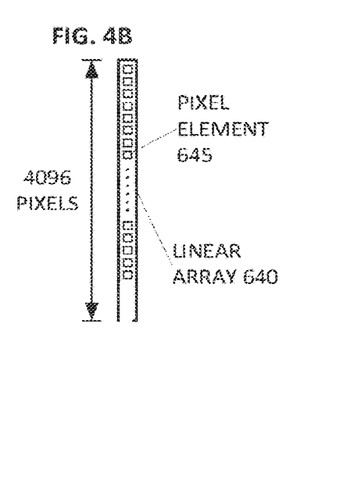
FIG. 4B is a block diagram illustrating an example line scan camera having a single linear array, according to an embodiment.

FIG. 4B illustrates a line scan camera having a single linear array 640, which may be implemented as a charge coupled device (CCD) array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view 625 varies in accordance with the magnification of the scanner system 550.

Figures 4C, 4D:
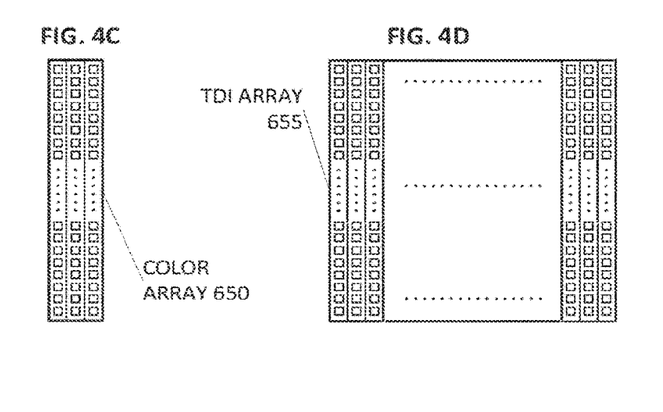
FIG. 4C is a block diagram illustrating an example line scan camera having three linear arrays, according to an embodiment.
FIG. 4D is a block diagram illustrating an example line scan camera having a plurality of linear arrays, according to an embodiment.

FIG. 4C illustrates a line scan camera having three linear arrays, each of which may be implemented as a CCD array. The three linear arrays combine to form a color array 650. In an embodiment, each individual linear array in the color array 650 detects a different color intensity, for example, red, green, or blue. The color image data from each individual linear array in the color array 650 is combined to form a single field of view 625 of color image data.

FIG. 4D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for handling slides for a slide scanning apparatus, the system comprising:
   a stage comprising a support surface configured to support a slide during scanning, by a scanning apparatus, the slide having a first side surface and a second side surface opposite the first side surface;
   a reference edge attached to the stage, wherein a facing side surface of the reference edge extends above the support surface, such that, when the slide is on the support surface, the facing side surface of the reference edge faces the first side surface of the slide;
   a movable opposing edge attached to the stage, wherein a facing side surface of the movable opposing edge extends above the support surface, such that, when the slide is on the support surface, the facing side surface of the movable opposing edge faces the second side surface of the slide, and wherein the movable opposing edge is configured to move toward the reference edge and away from the reference edge; and
   at least one processor configured to:
      as the slide is being scanned by the scanning apparatus, control the movable opposing edge to engage the second side surface of the slide, so as to apply a first amount of pressure from the movable opposing edge to the second side surface of the slide to urge the first side surface of the slide against the facing side surface of the reference edge, and,
      as the slide is being unloaded from the support surface of the stage such that the slide slides into a slot in a slide rack, controlling the movable opposing edge to contact the second side surface of the slide, so as to simultaneously apply during said unloading, a second amount of pressure, less than the first amount of pressure, from the movable opposing edge against the second side surface of the slide.

2. The system of claim 1, wherein the facing side surface of the reference edge is angled with respect to the support surface, such that, when the slide is on the support surface, an upper portion of the facing side surface of the reference edge contacts the slide and a lower portion of the facing side surface of the reference edge is recessed away from the slide.

3. The system of claim 2, wherein, when the upper portion of the facing side surface of the reference edge contacts the slide, the upper portion of the facing side surface of the reference edge imparts pressure on the slide toward the support surface.

4. The system of claim 1, wherein the facing side surface of the movable opposing edge is angled with respect to the support surface, such that, when the slide is on the support surface, an upper portion of the facing side surface of the movable opposing edge contacts the slide and a lower portion of the facing side surface of the movable opposing edge is recessed away from the slide.

5. The system of claim 4, wherein, when the upper portion of the facing side surface of the movable opposing edge contacts the slide, the upper portion of the facing side surface of the movable opposing edge imparts pressure on the slide toward the support surface.

6. The system of claim 1, wherein the movable opposing edge is a portion of an arm that pivots toward or away from the reference edge.

7. The system of claim 6, wherein the arm is a spring arm, and wherein the stage further comprises a spring configured to actuate the spring arm to pivot toward or away from the reference edge.

8. The system of claim 7, wherein the spring is a linear spring.

9. The system of claim 6, further comprising a rotary bearing attached to the arm, wherein the at least one processor is configured to pivot the arm via the rotary bearing.

10. The system of claim 1, further comprising in the slide rack, a plurality of slots configured to hold slides, wherein the at least one processor controls the movable opposing edge to move away from the reference edge when a respective slide held in a slot among the plurality of slots in the slide rack is loaded from the slot of the slide rack onto the support surface.

11. The system of claim 1, wherein the at least one processor controls the movable opposing edge to maintain the first amount of pressure, from at least a portion of the facing side surface of the movable opposing edge, to the second side surface of the slide, while the slide is being scanned.

12. The system of claim 11, further comprising in the slide rack, a plurality of slots configured to hold slides, wherein the at least one processor controls the movable opposing edge to maintain the second amount of pressure, from at least a portion of the facing side surface of the movable opposing edge, to the second side surface of the slide, when unloading the slide from the support surface to a slot among the plurality of slots in the slide rack.

13. The system of claim 1, further comprising:
in the slide rack, a plurality of slots configured to hold slides; and
an assembly configured to sequentially load the slides from each of the plurality of slots in the slide rack onto the support surface, and sequentially unload the slides from the support surface into each of the plurality of slots in the slide rack,
wherein the at least one processor is configured to control the assembly to sequentially load the slides from each of the plurality of slots in the slide rack onto the support surface, and sequentially unload the slides from the support surface into each of the plurality of slots in the slide rack.

14. The system of claim 13, wherein the reference edge is parallel to and aligned with a side of the plurality of slots.

15. The system of claim 1, wherein the support surface comprises a through hole, through which the slide can be illuminated while on the support surface.

16. The system of claim 15, further comprising an illumination system configured to illuminate the slide on the support surface, through the through hole, from below the support surface, while the slide is being scanned by the scanning apparatus.

17. The system of claim 1, wherein the slide is rectangular with opposing long sides and opposing short sides, and wherein the first side surface and the second side surface are on the opposing long sides of the slide.

18. A method of controlling the stage in the digital slide scanning apparatus of claim 1:
the method comprising, by the at least one processor:
as the slide is being loaded from the slot in the slide rack onto the support surface of the stage, controlling the movable opposing edge to remain away from the second side surface of the slide, so as not to apply any pressure from the movable opposing edge to the second side surface of the slide;
as the slide is being scanned, controlling the movable opposing edge to contact the second side surface of the slide, so as to apply the first amount of pressure from the movable opposing edge to the second side surface of the slide; and,
as the slide is being unloaded from the support surface of the stage into the slot in the slide rack, controlling the movable opposing edge to contact the second side surface of the slide, so as to apply the second, amount of pressure from the movable opposing edge to the second side surface of the slide.

19. The method of claim 18, wherein the second amount of pressure is less than the first amount of pressure.

* * * * *